United States Patent [19]

Kondo et al.

[11] Patent Number: 4,464,325
[45] Date of Patent: Aug. 7, 1984

[54] METHOD OF PRODUCING MULTI-KEY STRUCTURE FOR KEYBOARD MUSICAL INSTRUMENTS

[75] Inventors: Masao Kondo; Shinji Kumano, both of Hamamatsu, Japan

[73] Assignee: Nippon Gakki Seizo Kabushiki Kaisha, Hamamatsu, Japan

[21] Appl. No.: 368,802

[22] Filed: Apr. 14, 1982

[30] Foreign Application Priority Data

Apr. 14, 1981 [JP] Japan .................................. 56-55851

[51] Int. Cl.³ ............................................. B29D 3/00
[52] U.S. Cl. .................................... 264/229; 29/700;
84/433; 84/438; 264/250; 264/251; 264/275;
264/279.1; 264/328.1; 264/334; 264/339
[58] Field of Search ...................... 264/230, 251, 279.1,
264/334, 275, 277, 229; 84/433, 438; 29/527.1,
700

[56] References Cited

U.S. PATENT DOCUMENTS

4,317,012 2/1982 Itoh .................................... 264/277
4,318,879 3/1982 Görtner .............................. 264/275
4,395,817 9/1983 Asada et al. ........................ 264/251

Primary Examiner—James B. Lowe
Assistant Examiner—Mike McGurk
Attorney, Agent, or Firm—Cushman, Darby & Cushman

[57] ABSTRACT

There is disclosed a method of producing a multi-key structure for keyboard musical instruments. A molding material is filled in a mold to form a molded structure which has a proximal end portion and a plurality of juxtaposed key portions extending from the proximal end portion. Molding is carried out in a state that the respective adjacent key portions diverge toward their free ends. The molded structure is removed from the mold, and the proximal end portion is deformed in such a manner that the plurality of key portions are brought into parallel relation to one another to provide the multi-key structure.

7 Claims, 15 Drawing Figures

METHOD OF PRODUCING MULTI-KEY STRUCTURE FOR KEYBOARD MUSICAL INSTRUMENTS

BACKGROUND OF THE INVENTION

1. Field of the Invention

This invention relates to a method of producing a molded multi-key structure for keyboard musical instruments such as a portable electronic organ.

2. Prior Art

There is known a molded multi-key structure which has a plurality of juxtaposed key portions joined together at their proximal ends, the key portions being disposed in closely spaced relation to one another. Usually, the plural keys of such a multi-key structure are simultaneously formed by an injection molding. A mold designed to form the multi-key structure has wall sections of quite reduced thickness which define the narrow spacings between the key portions. Naturally, such thin wall sections had a reduced mechanical strength and have been liable to fracture damage due to the pressure of the molding material applied to the cavity of the mold during the injection molding operation.

One method of overcoming this difficulty has been to first form small groups of plurality of keys using separate molds of different designs and then to join them together to provide a multi-key structure. This procedure has been found disadvantageous, however, in that it requires much time and labor in assembling the keys.

SUMMARY OF THE INVENTION

It is therefore an object of this invention to provide a method of producing a molded multi-key structure for keyboard musical instruments which prevents a mold from being subjected to damage during the molding operation.

Another object of the invention is to provide a method of molding the multi-key structure capable of simultaneously producing white or black keys of sufficient number for a portable electronic organ.

According to the present invention, there is provided a method of producing a multi-key structure for keyboard musical instruments which comprises the steps of filling a cavity of a mold with a molten molding material to form a molded structure which has a proximal end portion and a plurality of juxtaposed key portions extending from the proximal end portion, each adjacent key portions diverging toward their free ends; and removing the molded structure from the mold and deforming the proximal end portion in such a manner that the plurality of key portions are brought into parallel relation to one another to provide the multi-key structure.

Other advantages, features and additional objects of the present invention will become manifest to those versed in the art upon making reference to the detailed description and the accompanying sheets of drawings in which preferred embodiments incorporating the principles of the present invention are shown by way of illustrative examples.

DETAILED DESCRIPTION OF THE PREFERRED EMBODIMENTS

Figures 1, 5:
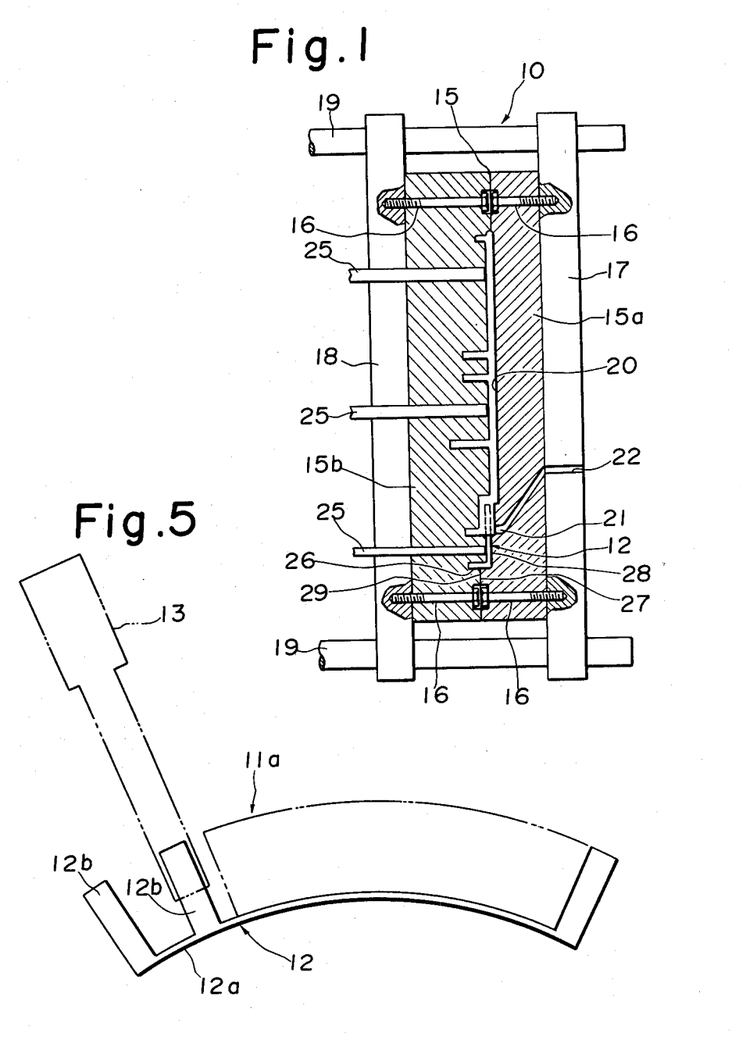
FIG. 1 is a cross-sectional view of a molding apparatus for producing a multi-key structure according to the present invention.
FIG. 5 is a plan view of a preformed multi-key structure formed by the molding apparatus, showing key portions in a broken line.
Figure 2:
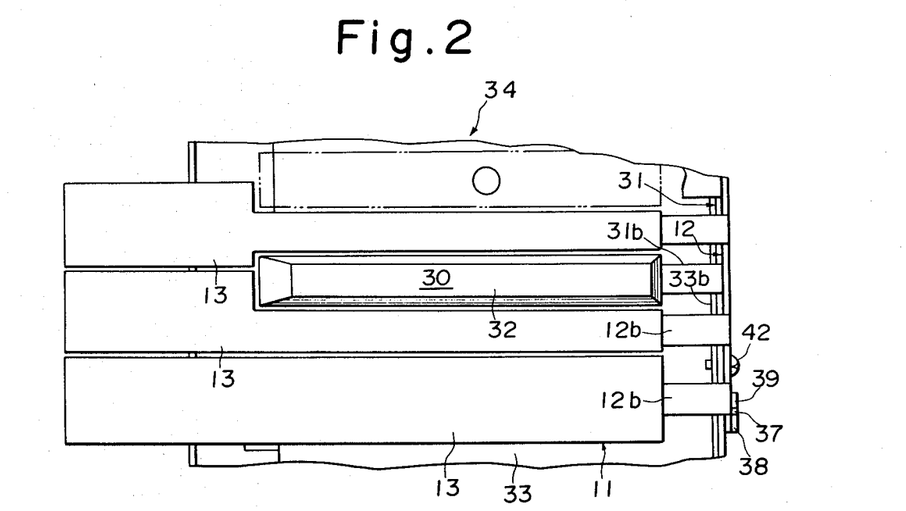
FIG. 2 is a fragmentary plan view of a keyboard structure employing the multi-key structure.
Figure 3:
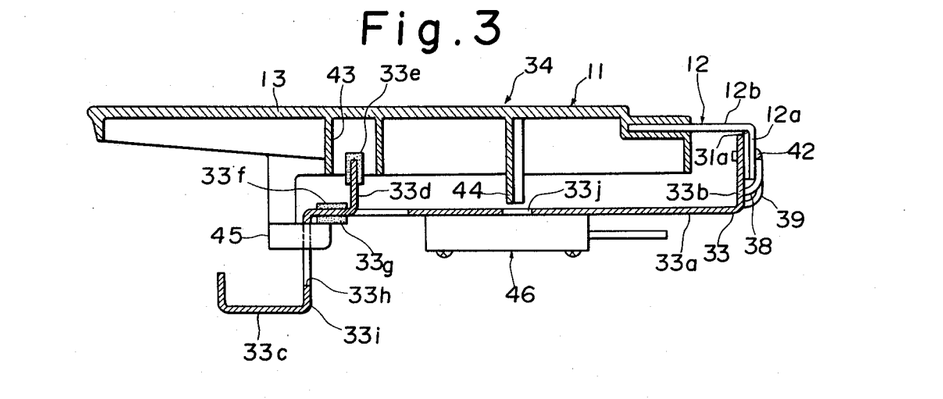
FIG. 3 is a cross-sectional view of the keyboard structure.

FIG. 1 shows a molding apparatus 10 which is designed, in this example, to form a white-key assembly of a molded multi-key structure 11 (FIGS. 2 and 3).

Figure 4:
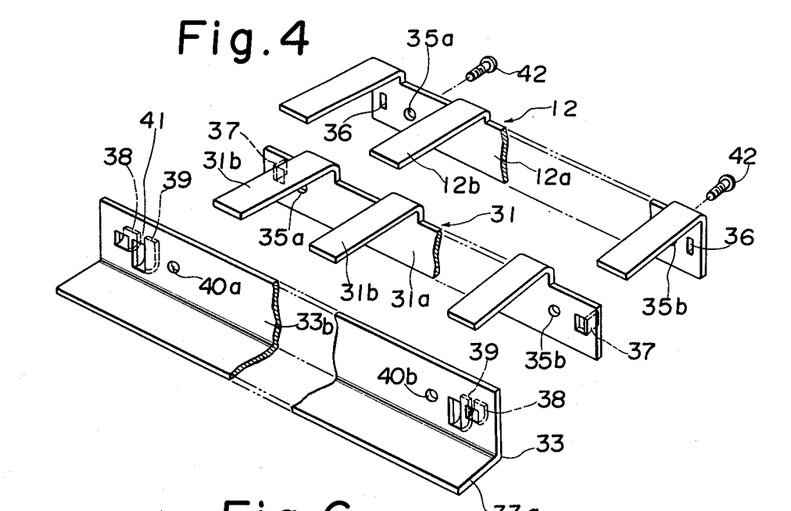
FIG. 4 is an exploded, perspective view of the keyboard structure.

The multi-key structure 11 comprises a resilient member 12 made of metal and a plurality of molded key portions 13 extending from the resilient member 12 in juxtaposed relation. As best shown in FIG. 4, the resilient member 12 of a one-piece construction has a linear base 12a of a rectangular shape and a plurality of parallel arms 12b of a rectangular shape extending perpendicularly from the elongated base 12a at its upper edge and spaced along the length thereof. The resilient member 12 has an inverted L-shape when viewed in the direction of the length thereof. The resilient member 12 comprises a spring metal plate which is processed by a stamping operation to provide the arms 12b. The arms 12b are bent through 90 degrees into the final configuration as shown in FIG. 4. Each of the key portions 13 is molded to a free end of a respective one of the arms 12b and extends in parallel relation thereto.

As shown in FIG. 1, the molding apparatus 10 comprises a mold 15 which comprises first and second sections 15a and 15b. The first and second mold sections 15a and 15b are fixedly secured by bolts 16 to first and second platens 17 and 18, respectively. The first platen 17 is fixedly mounted on guide rods 19 while the second platen 18 is slidably mounted on the guide rods 19 for movement therealong toward and away from the first platen 17. Thus, the second mold section 15b is movable toward and away from the first mold section 15a. The second platen 18 is actuated to move along the guide rods 19 by an actuator means (not shown).

The first and second mold sections 15a and 15b have recesses formed in their opposed faces, respectively, these recesses jointly providing juxtaposed cavities 20 of the mold 15 when the first and second mold sections 15a and 15b are mated together at their opposed faces as shown in FIG. 1. The mold cavities 20 correspond in shape to the key portions 13, respectively, each adjacent cavities 20 diverging toward their upper ends (FIG. 1).

Gates 21 are formed through the first mold section 15a for supplying the mold cavities 20 with the molding material. The first platen 17 has a port 22 formed therethrough and communicating with the gates 21. A plurality of ejector rods 25 slidably extend through the second mold section 15b and the second platen 18 for ejecting the molded multi-key structure 11 from the mold 15 as will hereinafter more fully be described.

The second mold section 15b has a groove 26 formed in its inner lower surface 27 facing the first mold section 15a, the groove 26 having an arcuate configuration. When the two mold sections 15a and 15b are mated together, a plurality of spaced grooves 28 of a rectangular shape are formed between the opposed inner lower surfaces 29 and 27 thereof, the grooves 28 opening to the arcuate groove 26 and the cavities 20 at the opposite ends thereof, respectively. Each adjacent grooves 28 diverge toward the mold cavities 20.

For molding the multi-key structure 11, the resilient member 12 is first placed on the second mold section 15b with the base 12a snugly received in the arcuate groove 26, so that the base 12a is resiliently deformed or flexed into an arcuate configuration with each adjacent arms 12a diverging toward their free ends, as shown in FIG. 5. The thus deformed resilient member 12 is retained in the mold section 15a under its own restoring action. Then, the second platen 18 is actuated by the actuator means to move toward the first platen 17 so that the second mold section 15b is mated with the first mold section 15a to form the mold cavities 20 therebetween. In this condition, the lower halves of the arms 12a are received in the grooves 28, respectively, while the upper halves extend into the mold cavities 20, respectively.

Then, a molten molding material of white color such as a synthetic resin is injected into the mold cavities 20 through the gates 21. The mold 15 is allowed to be cooled for a predetermined length of time (for example, 30 seconds) so that the molding material in the mold cavities 20 is solidified to provide a preformed multi-key structure 11a of a unitary construction. As shown in FIG. 5, the preformed multi-key structure 11a comprises the plurality of key portions 13 molded at their inner ends to the respective arms 12b of the resilient member 12, each adjacent key portions 13 diverging toward their outer or free ends.

Then, the second platen 18 is returned to its inoperative position by the actuator means so that the second mold section 15b is moved away from the first mold section 15a. When the second mold section 15b is retracted from the first mold section 15a, the molded structure 11a is adhered to the second mold section 15b and moved therewith. During the retracting stroke of the second platen 18, the outer ends of the slidable ejector rods 25 are brought into engagement with a stop means (not shown) so that the second platen 18 and the second mold section 15b move relative to the ejector rods 25. Since the inner ends of the ejector rods 25 are held in contact with the preformed multi-key structure 11a, the structure 11a is ejected from the second mold section 15b upon movement of the mold section 15b relative to the ejector rods 25.

The preformed multi-key structure 11a taken out of the mold 15 is still retained in the arcuate configuration (FIG. 5) because of the presence of the runner connecting the key portions 13 at their inner ends. Finally, the runner is removed from the preformed multi-key structure 11a so that the flexed base 12a of the resilient member 12 is straightened under its own restoring action with the arms 12b being brought into parallel relation to one another. As a result, the key portions 13 are also brought into parallel relation to one another to provide the multi-key structure 11.

With this molding method, each adjacent cavities 20 are disposed in diverging relation so that the wall sections between the adjacent cavities 20 have a relatively increased thickness. Therefore, the wall sections are not subjected to fracture damage due to the pressure of the molding material injected into the mold cavities 20. Thus, the mold 15 can be properly used for a prolonged period of time. Further, the mold 15 of such a design can be easily manufactured.

A molded multi-key structure 30 (FIG. 2) which constitutes a black-key assembly is produced according to the same procedure as described above for the multi-key structure 11. In this case, the mold 15 of the molding apparatus 10 has a different cavity arrangement, and a resilient member 31 of a different design is employed (FIG. 4). The resilient member 31 differs from the resilient member 12 in that a plurality of arms 31b extend from a base 31a in offset relation to the arms 12b when the two bases 12a and 31a of the same length are mated together in coextensive relation.

As best shown in FIG. 3, each of the white key portions 13 has an elongated body of a generally channel-shaped cross-section. Similarly, each of the black key portions 32 is of a channel-shaped construction. The multi-key structures 11 and 30 are mounted on a frame or chassis 33 to provide a keyboard structure 34 for a portable electronic organ.

As best shown in FIG. 3, the one-piece frame 33 of metal has a rectangular base 33a, a key-mounting portion 33b extending upwardly from the base 33a at its rear edge, and an upwardly-opening channel portion 33c extending along the front edge of the base 33a.

The manner in which the multi-key structures 11 and 30 are mounted on the frame 33 will be described with reference to FIG. 4 in which the key portions 13 and 32 are omitted for purposes of clarity.

Each of the resilient members 12 and 31 has a pair of screw holes 35a and 35b formed through the opposite ends of the base 12a, 31a. The base 12a has a pair of rectangular apertures 36 formed therethrough adjacent to the screw holes 35a and 35b. The base 31a has a pair of stamped-out tabs 37 formed adjacent to the screw holes 35a and 35b, the tabs 37 being adapted to be received in the apertures 36, respectively. The resilient members 12 and 31 are processed to provide the screw holes 35a and 35b, the apertures 36 and the tabs 37 after the multi-key structures 11 and 30 are taken out of the mold 15.

A pair of stamped-out outer lugs 38 are formed on the opposite ends of the key-mounting portion 33b of the frame 33, and another pair of stamped-out inner lugs 39 of a greater length are formed on the key-mounting portion 33b adjacent to the outer lugs 38. The outer and inner lugs 38 and 39 has a J-shaped configuration when viewed in the direction of the length of the key-mounting portion 33b. As best shown in FIG. 4, the upper ends of the outer and inner lugs 38 and 39 are disposed at the same level while the lower end of the inner lug 39 is disposed at a level below the lower end of the outer lug 38. A pair of screw holes 40a and 40b are formed through the key-mounting portion 33b adjacent to the inner lugs 39.

Figure 6:
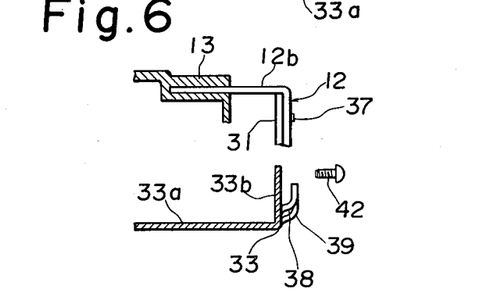
FIG. 6 is a fragmentary cross-sectional view of the keyboard structure.

As shown in FIG. 6, the two resilient members 12 and 31 are connected together with the tabs 37 snugly received in the apertures 36, respectively, the bases 12a and 31a being mated together. In this condition, the arms 12b do not overlap the arms 31b with these arms being disposed in a common plane, and the screw holes 35a and 35b in the base 12a are disposed in alignment with the screw holes 35a and 35b in the base 31a, respectively. Then, the thus preassembled multi-key structures 11 and 30 are mounted on the frame 33 with the base 31a mated with the key-mounting portion 33b. Each end portion of the mated bases 12a and 31a is snugly received in the adjacent outer and inner lugs 38 and 39 with each tab 37 fitted in a space 41 between the adjacent lugs 38 and 39. In this condition, the aligned screw holes 35a and 35b of the bases 12a and 31a are disposed in alignment with the screw holes 40a and 40b of the key-mounting portion 33b, respectively. Screws 42 are threaded into the thus aligned screw holes 35a, 40a and 35b and 40b, respectively, to tie the multi-key structures 11 and 31 and the frame 33 together so as to provide the keyboard structure 34.

As shown in FIG. 3, each white key portion 13 as well as each black key portion 32 (not shown) has a key switch actuator section 44 depending therefrom intermediate the opposite ends thereof, and a retaining section 45 of an L-shape extending downwardly therefrom and disposed forwardly of the actuator section 44. A plurality of stamped-out webs 33d are formed on the base 33a of the frame 33, and the upper portion of each web 33d is covered with a felt member 33e. A pair of felt strips 33f and 33g are affixed to the opposite surfaces of the frame base 33a adjacent to the web 33d. A plurality of openings 33h are formed through the front wall 33i of the frame 33. Each L-shaped retaining section 45 extends through a respective one of the openings 33h. A plurality of apertures 33j are formed through the frame base 33a, and each actuator section 44 is disposed in registry with a respective one of the apertures 33j. A key switch assembly 46 is secured to the underside of the frame base 33a, the key switch assembly 46 containing an electrically conductive rubber strip and switch contacts.

Each key portion 13, 32 is normally held in its raised or inoperative position shown in FIG. 3 with the L-shaped retaining section 45 held in abutting engagement with the felt strip 33g to limit the upward movement of the key portion. Upon depression of each key portion 13, 32 into its lowered or operative position against the bias of the resilient arm 12b, 31b, a transverse wall 43 of the key portion is brought into contact with the felt strip 33f to limit the downward movement thereof. At this time, the actuator section 44 is introduced into the aperture 33j and urges the electrically conductive rubber strip into contact with the switch contact so that associated tone generating circuit and other circuits, contained in a casing of the electronic organ, are energized to electronically sound a selected note in a well known manner through an associated loud speaker. Upon release of the depressed key portion, it is returned to its raised position under the influence of the resilient arm 12b, 31b.

Figure 7:
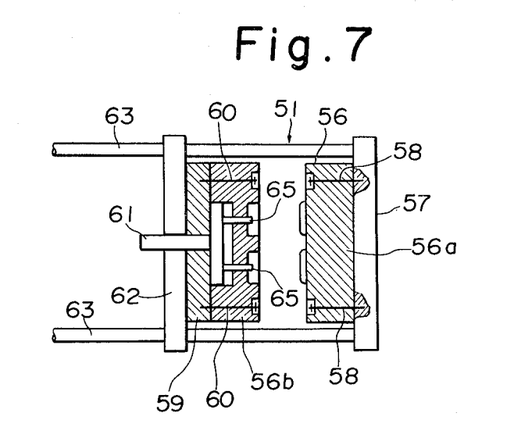
FIG. 7 is a cross-sectional view of a modified molding apparatus.
Figure 8:
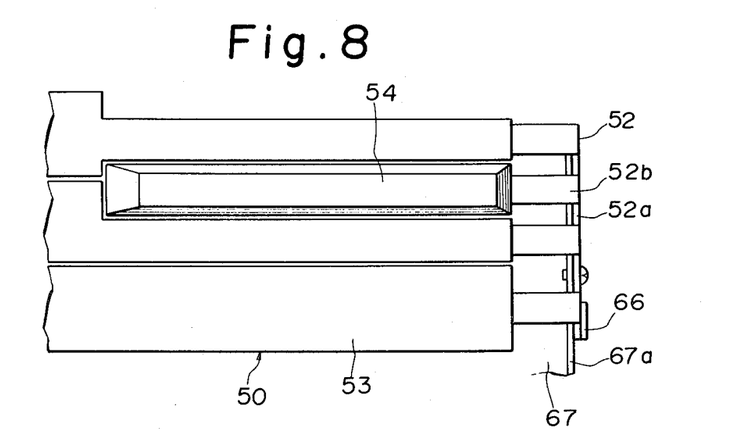
FIG. 8 is a fragmentary plan view of a keyboard structure employing a multi-key structure formed by the molding apparatus of FIG. 7.
Figures 9, 10:
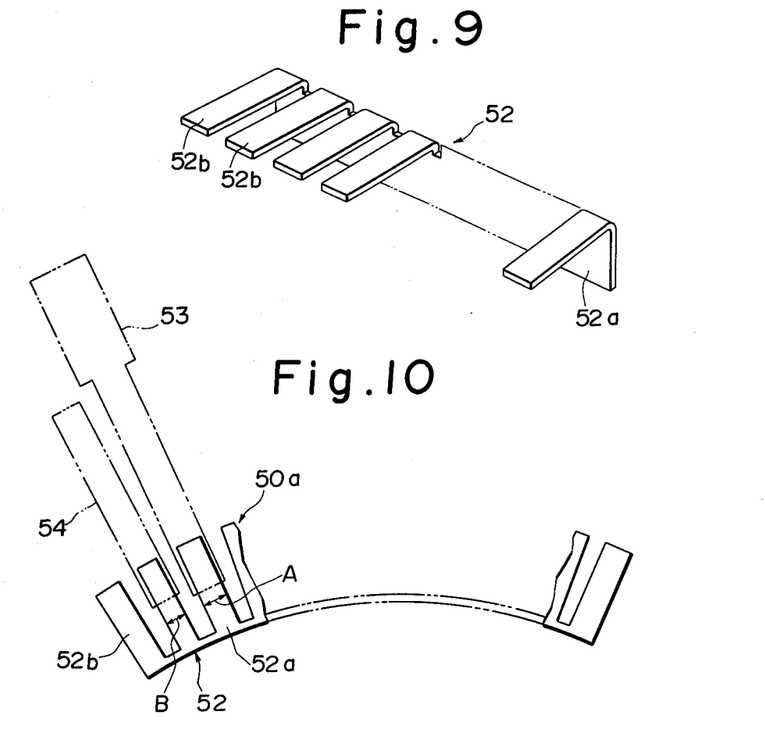
FIG. 9 is a partly-broken, perspective view of a resilient member of the multi-key structure of FIG. 8.
FIG. 10 is a plan view of the multi-key structure of FIG. 8 in its preformed configuration.

A modified molded multi-key structure 50 which has both white and black key portions will now be described with reference to FIGS. 7 to 11. FIG. 7 shows a molding apparatus 51 for forming the multi-key structure 50. As shown in FIG. 8, the multi-key structure 50 comprises a single and common resilient member 52 and a plurality of juxtaposed white and black key portions 53 and 54 extending from the resilient member 52. As best shown in FIG. 9, the resilient member 52 of a one-piece construction has a linear base 52a and a plurality of parallel arms 52b extending perpendicularly from the base 52a, as described above for the resilient member 12. The white and black key portions 53 and 54 are molded to their respective arms 52b. Each while key-carrying arm 52b and each black key-carrying arm 52b have predetermined widths "A" and "B" shown in FIG. 10, respectively wherein the ratio of "A" to "B" is about 3:2, so that all the long white and short black keys have a uniform touch.

As shown in FIG. 7, the molding apparatus 51 comprises a mold 56 which comprises first and second sections 56a and 56b. The first mold section 56a is fixedly secured to a first platen 57 by bolts 58 while the second mold section 56b is fixedly secured to a rotatable plate 59 by bolts 60. A shaft 61 is fixedly secured to the rotatable plate 59 at the center thereof, the shaft 61 being rotatably supported by a second platen 62. The second platen 62 is movable along guide rods 63 as described above for the molding apparatus 10. The first or stationary mold section 56a has a white key molding region at its upper portion and a black key molding region at its lower portion. The second or movable mold section 56b has a common molding region at its upper portion. The second mold section 56b is rotatable relative to the first mold section 56a so that the common molding region alternately cooperates with the white key and black key molding regions to form cavities for molding the respective key portions when the first and second mold sections 56a and 56b are mated together at their opposed faces. Ejector rods 65 are slidably mounted on the second mold section 56b.

For molding the multi-key structure 50, the resilient member 52 is first placed in position on the second mold section 56b with the base 52a being resiliently deformed or flexed into an arcuate configuration, as described above for the preceding embodiment. In this condition, each adjacent arms 52a diverge toward their free ends, as shown in FIG. 10. Then, the second platen 62 is moved toward the first platen 57 to bring the second mold section 56b into mating relation to the first mold section 56a so that the common molding region cooperates with the white key molding region to provide the white key-forming cavities. Then, a molten molding material of white color is injected into the mold cavities through first gates. The mold 56 is allowed to be cooled so that the molding material in the mold cavities is solidified to provide the white key portions 53 molded to the free ends of the white key-carrying arms 52b. Each adjacent white key portions 53 diverge toward their free ends.

Then, the second mold section 56b is moved away from the first mold section 56a with the resilient member 52 and the white key portions 53 molded thereto carried by the second mold section 56b. Then, the second mold section 56b, is rotated or angularly moved about the shaft 61 through 180 degrees relative to the first mold section 56a. Thereafter, the second mold section 56b is again moved to be mated with the first mold section 56a so that the common molding region and the black key molding region jointly provide the black key-forming cavities. Then, a molten molding material of black color is injected into these cavities through second gates. The mold 56 is allowed to be cooled so that the molding material in the mold cavities is solidified to provide the black key portions 54 molded to the free ends of the black key-carrying arms 52b, thereby providing a preformed multi-key structure 50a as shown in FIG. 10. As described above for the white key portions 53, each adjacent black key portions 54 diverge toward their free ends.

Then, the second mold section 56b together with the preformed multi-key structure 50a is moved away from the first mold section 56a, and the preformed multi-key structure 50a is ejected from the second mold section 56b by the ejector rods 65. The preformed multi-key structure 50a is still retained in the arcuate configuration as shown in FIG. 10, and the runners are removed as described above for the preformed multi-key structure 11a so that the flexed base 52a of the resilient member 52 is straightened under its own restoring action. Therefore, the arms 52b and hence the white and black key portions 53 and 54 are brought into parallel relation to provide the multi-key structure 50.

Figure 11:
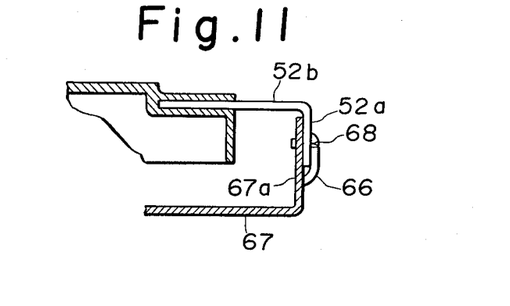
FIG. 11 is a fragmentary cross-sectional view of the keyboard structure of FIG. 8.

As shown in FIG. 11, a pair of stamped-out lugs 66 of a J-shaped cross-section are formed on a key-mounting portion 67a of a keyboard frame 67 adjacent to the opposite ends thereof. The opposite end portions of the base 52a are snugly received in the pair of lugs 66, respectively, and the resilient member 52 and the frame 67 are tied together by screws 68 passing through the base 52a and the key-mounting portion 67a. Thus, the multi-key structure 50 which employs the single resilient member can be easily mounted on the frame 67.

As described above, the multi-key structures 11, 30 and 50 comprise the respective resilient metal members or inserts 12, 31 and 52 which serve as the base portions or proximal end portions of the structures 11, 30 and 50. A multi-key structure 70 shown in FIG. 12 obviates the need for such a metal insert. The integrally-molded multi-key structure 70 is composed entirely of white molding material and constitutes white keys for the keyboard. A preformed multi-key structure 70 (FIG. 13) of a one-piece construction is formed by a molding apparatus which differs from the molding apparatus 15 of FIG. 1 only in that it does not employ a resilient metal insert. The preformed multi-key structure 70a comprises an elongated proximal end portion 71 and a plurality of juxtaposed key portions 72 extending from the elongated end portion 71. The elongated end portion 71 assumes an arcuate configuration in the direction of the length thereof, with each adjacent key portions 72 diverging toward their free or distal ends. For providing the multi-key structure 70 shown in FIG. 12, the arcuate end portion 71 is straightened so that the plurality of key portions 72 are brought into parallel relation to one another. In order to facilitate the elastic deformation of the arcuate end portion 71, a plurality of V-shaped notches 73 are formed in the outer edge of the end portion 71. The notches 73 may be of a U-shape and also may be formed in the opposite edges of the end portion 71.

Figure 12:
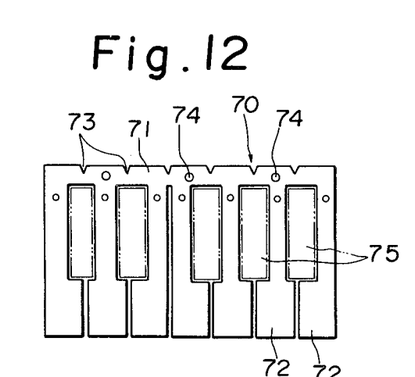
FIGS. 12 and 13 are plan views of another modified multi-key structure.
Figure 13:
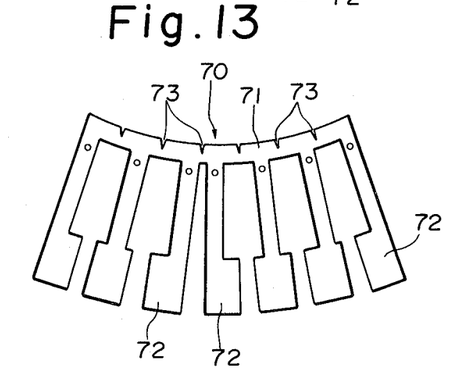

The multi-key structure 70 is connected by screws 74 to a multi-key structure 75 which constitutes black keys for the keyboard, as shown in FIG. 12. The multi-key structure 70 has registration projections which are fitted into respective holes formed in the multi-key structure 74 to properly position the structure 74 relative to the structure 70 when they are connected together.

Figure 14:
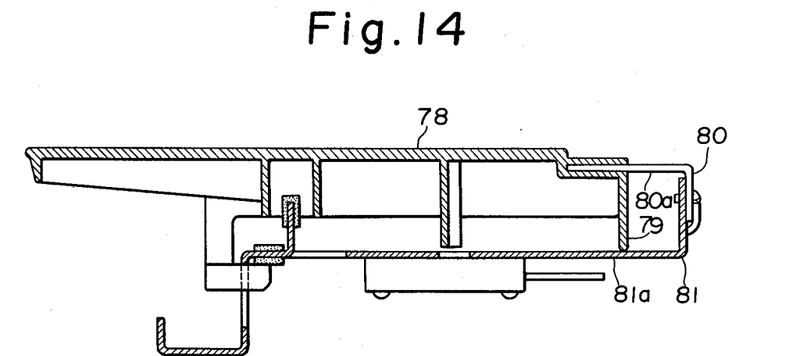
FIGS. 14 and 15 are cross-sectional views of a modified keyboard structure.
Figure 15:
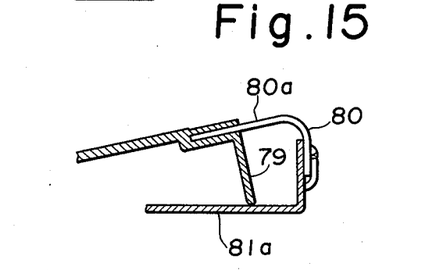

According to a further modified form of the invention as shown in FIG. 14, each key portion 78 has a tongue 79 depending from the rear end thereof which is molded to an arm 80a of a resilient member 80 similar to the resilient member 52 of FIG. 9. The lower end of the tongue 79 is rounded and held in sliding contact with an upper surface of a base 81a of a frame 81. Upon depression of the key portion 78 against the bias of the resilient member 80, the lower end of the tongue 79 slides along the upper surface of the frame base 81a so that a good touch of the key portion is obtained for a prolonged period of time.

The keyboard structures as described above may be used for any keyboard musical instrument other than the portable electronic organ, such as a keyboard wind instrument, a conventional organ, etc.

In the illustrated embodiments, the frames of the keyboards are shown to support the multi-keys constituting an octave group, but it may be modified to support the multi-keys forming either half an octave group or octave groups.

As described above, since the key portions of the multi-key structures are molded in diverging relation in the mold of the molding apparatus, the wall sections between the adjacent mold cavities have a relatively increased thickness. Therefore, the wall sections are prevented from fracture damage due to the pressure of the molding material injected into the mold cavities. In addition, the mold having such thickened wall sections can be manufactured more easily in comparison with the conventional molds under consideration which have relatively thin wall sections between adjacent cavities. Further, the molded multi-key structures can be easily formed into the final configuration simply by straightening either the flexed metal resilient members or the arcuate integral proximal end portion as described above.

What is claimed is:

1. A method of producing a multi-key structure for keyboard musical instruments which comprises the steps of:
   (a) filling a cavity of mold means with a molding material to form a molded structure which has a proximal end portion and a plurality of juxtaposed key portions extending from said proximal end portion, the respective adjacent key portions being connected with each other at said proximal end portion and diverging toward their free ends; and
   (b) removing said molded structure from said mold means and deforming said proximal end portion in such a manner that said plurality of key portions are brought into parallel relation to one another to provide the multi-key structure.

2. A method according to claim 1, in which said proximal end portion comprises a resilient member which is placed in position in said mold cavity as an insert, said resilient member being resiliently deformed longitudinally into an arcuate configuration in said mold, and said resilient member being caused to be straightened under its own restoring action after said molded structure is removed from said mold means, thereby bringing said plurality of key portions into parallel relation to one another.

3. A method according to claim 2, in which said resilient member comprises a metal plate which has a linear base and a plurality of parallel arms extending angularly from said base and spaced along the length thereof, each of said key portions being molded to a free end of each of said arms, said base being resiliently deformed longitudinally into an arcuate configuration in said mold, with each adjacent arms diverging toward their distal ends, and said base being caused to be straightened under its own restoring action after said molded structure is removed from said mold means, thereby bringing said arms into parallel relation to one another.

4. A method according to claim 3, in which said arms extend from said base at its upper edge so that said resilient member has an inverted L-shape when viewed in the direction of the length thereof.

5. A method according to claim 1 or 2, in which steps for molding a group of white keys and a group of black keys are separate and the molded white keys and the molded black keys are assembled after molding to form the multi-key structure.

6. A method according to claim 1, in which said mold means includes a molding cavity to form said proximal end portion which is molded integrally with said molded structure, said proximal end portion providing a resilient portion for swinging movement of the key portions.

7. A method according to claim 1 or 2, in which said mold means includes a molding cavity to form, at said proximal end portion, fulcrum portions which are molded integrally with said molded structure, the respective key portions being swingable around said fulcrum portions.

* * * * *